United States Patent [19]

Kear et al.

[11] 4,250,229

[45] Feb. 10, 1981

[54] INTERLAYERS WITH AMORPHOUS STRUCTURE FOR BRAZING AND DIFFUSION BONDING

[75] Inventors: Bernard H. Kear, Madison; William H. King, Higganum, both of Conn.

[73] Assignee: United Technologies Corporation, Hartford, Conn.

[21] Appl. No.: 26,985

[22] Filed: Apr. 4, 1979

[51] Int. Cl.³ .............................................. B22F 5/00
[52] U.S. Cl. .................................... 428/606; 428/607
[58] Field of Search ............................... 428/606, 607

[56] References Cited

U.S. PATENT DOCUMENTS

| | | | |
|---|---|---|---|
| 3,382,054 | 5/1968 | Coad | 428/607 |
| 3,492,545 | 1/1970 | Meyerhoff | 428/607 |
| 3,678,570 | 7/1972 | Paulonis et al. | 29/498 |
| 3,753,794 | 8/1973 | Paulonis et al. | 148/32 |
| 4,122,240 | 10/1978 | Banas et al. | 428/655 |
| 4,122,992 | 10/1978 | Duvall et al. | 228/176 |
| 4,148,973 | 4/1979 | Sexton et al. | 428/606 |

OTHER PUBLICATIONS

DeCristofaro et al.; *Welding Journal,* Jul. 1978, p. 33, "Metglas Brazing Foil".

*Primary Examiner*—Brooks H. Hunt
*Attorney, Agent, or Firm*—Charles G. Nessler

[57] ABSTRACT

Disclosed is an interlayer for brazing and diffusion bonding, having a portion as a continuous stratum with an amorphous structure. The amorphous stratum of the interlayer, being ductile, imparts structural integrity to the otherwise brittle alloy composition. Thus, forming and shaping of the interlayer to faying surfaces are improved. In the joining process, the interlayer melts, and on solidifying by cooling or interdiffusion of elements, is converted to a crystalline solid metallurgically bonded to the workpiece. Preferred are flat ribbons with a continuous amorphous surface stratum comprising at least 30 volume percent, and up to 100 percent, of the interlayer.

14 Claims, 2 Drawing Figures

INTERLAYERS WITH AMORPHOUS STRUCTURE FOR BRAZING AND DIFFUSION BONDING

The field of the invention is joining of metals. More particularly, the invention is concerned with brazing and liquid phase diffusion bonding of metal workpieces using metal interlayers between the faying surfaces.

Brazing is a method of joining metals wherein a lower melting point material is interposed as a filler between two higher melting point metal surfaces. Through the application of heat, the brazing material is caused to melt and, by capilarly action, to fill the space between the metals. After melting occurs, the assembly is cooled. Usually, there is a slight degree of alloying at the braze-base metal interface.

Transient liquid phase diffusion bonding (called TPL ® bonding by the United Technologies Corporation) has been shown to be a useful method of joining superalloys for gas turbine engines and is disclosed in U.S. Pat. Nos. 3,678,570; 3,753,794; 4,005,988 and others. As in brazing, a thin alloy filler, or interlayer, is interposed between the surfaces to be joined. After heating to cause melting of the interlayers, the assembly is held above the melting temperature to promote interdiffusion between the base metal and filler. Among other phenomena, elements such as boron, which are typically used as melting point depressants in the interlayer, are caused by atomic diffussion to migrate into and throughout the base metal, thereby causing solidification of the joint. While the detail methods of brazing, TLP bonding and other analogous liquid phase joining processes differ with respect to the heating cycle and solidification phenomena, the filler alloys used for joining superalloys often have many similarities. Alloys of the desired composition for fillers are typically nickel-base and contain mostly chromium, cobalt, iron, silicon, and boron. To carry out the objects of the TLP bonding method, compositions are more precisely controlled and tailored to the types of superalloys being joined than when brazing is the object.

During mass production using brazing or TLP bonding, it is common practice to preplace the filler material. One way this is achieved is by forming the filler alloy into a suitable shape, called a preform, and inserting it between or adjacent to the surfaces to be joined before heating. It is desirable that the preform by formable to the nominal shape of the faying surface of the joint. Because if the preform cannot assume the necessary contour, the faying surfaces may be unduly kept apart; provision must either be made to move the surfaces together or to supply additional filler material to the joint during bonding to avoid an imperfect, unfilled joint. Both preventive actions are undesirable. Another problem arises if the preform does not have a surface area which substantially matches the area of the faying surfaces; an undesirable surplus or deficiency of filler material may result.

For many joint configurations, particularly those having contoured surfaces, it is desirable that the preform be supplied in a sheet or foil, 0.05 to 0.25 mm thick. One method of achieving this is to adhere particulate filler material to a thermoplastic carrier sheet which volatilizes prior to melting of the alloy. Not only are there potential problems with the carrier residue, but the low effective density of filler engenders the previously mentioned problems attending poor preform configuration.

Most suitable are thin metal foil preforms, cut to the joint area and complying to the joint contour, either by stamping or in situ forming. However, a characteristic of many high temperature filler alloys of the types described above is that they tend to be very hard and brittle, due to the enrichment in melt depressants such as boron, and therefore are not readily rolled or formed into thin foils. One method of overcoming this problem is indicated in Paulonis et al, U.S. Pat. No. 3,753,794, wherein formable alloy in thin foil form is modified in composition by the surface addition of a melting point depressant element, such as boron. The interlayer so formed has a ductile interior and brittle exterior, allowing it to be die stamped to a complex shape. However, the interlayer formed in such a manner is costly to fabricate and is limited to certain core compositions. Further, the boron is not evenly distributed through the interlayer and the local melting point varies.

Another approach, embodied in U.S. Pat. Nos. 4,005,988 and 4,122,992 is to introduce the filler as a coating on one of the faying surfaces. However, this approach is limited in that the incorporation of a multiplicity of elements in the interlayer is not convenient, and usually at the most, three elements are included. Further, there can be adverse economics.

Thus, interlayer foils currently appear most attractive. But there is a need for an improved superalloy bonding and brazing interlayer foil, having a desired multi-element homogeneous composition but capable of being economically produced and readily formed for complex joints.

Common braze and TLP foils, like most metals of common experience have a crystalline metal structure. Actually, little attention has been given to their microstructures heretofore, other than to obtain general homogeneity. It has been evident for sometime that certain metal alloys can exist in a metastable amorphous solid state. As such, they are characterized by an absence of the long-range atomic ordering characteristic of the more familiar crystalline state. Amorphous metals also called glassy metals, evidence substantially different properties from the same compositions in the crystalline state. Amorphous metals are formed by methods such as rapid quenching of liquid metals and physical or chemical deposition. While they have long been known to exist, in recent years more attention has been given to the development of useful amorphous materials. Various amorphous metal ribbons are currently obtainable commercially.

Compositions of, and methods for making amorphous metals are described in the technical literature, including a number of patents. A review of this literature shows a recent trend towards novel materials for specialized applications. For example, Chen U.S. Pat. No. 3,856,513 describes alloys for resisting radiation damage and corrosion, and alloys having low electrical resistivity; among uses suggested are reinforcing elastomers and plastics, forming electromagnets, and the like. Other more recent patents describe refractory element containing alloys for applications as diverse as razor blades and magnetostrictive devices. For a metal to be convertible to an amorphous solid it must have a particular composition and liquid state structure. It is said that the more readily formed amorphous alloys are mixtures of two transition metals or are transition or noble metals containing about 20 atomic percent metalloid, e.g., silicon, boron and phosphorous. Nonetheless, whether a particular composition can be made amorphous, and the conditions necessary to attain same, are largely a matter of experiment.

Generally amorphous metals are characterized by very high tensile strengths and hardnesses. It is these properties, coupled with the retention of a modicum of ductility, which make them most appealing for mechanical design concepts. Of course, any amorphous property advantages are lost as soon as a material is heated above the temperature at which the metastable phase converts to a crystalline structure. Typically, this transition temperature is approximately half the melting point. Thus, it has been an object of past development to devise new composition alloys with higher transition temperatures. And when an existing composition alloy is considered for use in its amorphous form, it has been obvious that the only suitable uses are those where it is maintained below its transition temperature. Therefore, since braze and TLP alloys are by their nature put into use by heating to high temperatures, and since amorphous metals are by nature not usable as such at high temperature, prior to the invention herein there was no obvious useful connection.

SUMMARY OF THE INVENTION

An object of the invention is to provide an improved method and interlayer foil for brazing and bonding. A further object is to provide ductile and formable interlayers suitable for joining complex alloys.

The present invention embraces the concept that an interlayer foil with an amorphous metal structure produces an improved brazed or diffusion bonded structure, even though all trace of the amorphous structure is destroyed in making the final joined product. Hereafter, the designations TMP (Transient Metastable Phase) bonding and TMP interlayer are used when referring to processes and articles of the invention.

As previously mentioned, there was no appreciation heretofore that an amorphous atomic structure would be of utility in a product or process wherein heating above the metastable phase transition temperature was inherent and amorphous properties were lost.

According to the invention, an improved TMP interlayer for joining metal workpieces is formable as a separate element with amorphous metal structure, is meltable at a temperature lower than the metals being joined, and is adapted to be solidified as a metallurgically bonded and crystalline solid between the faying surfaces of the workpieces. TMP interlayers in accord with the invention have at least 30 percent amorphous structure, thereby making them capable of being formed and shaped for joining purposes, even though they contain embrittling elements. As stated, TMP interlayers may be fully amorphous throughout. But TMP bonding desirably does not require interlayers of such character. Fully amorphous interlayers are more difficult to make when substantial thickness is required. When only a portion of the TMP interlayer is amorphous, the amorphous portion will be a continuous layer on at least one surface of the interlayer. Thus, such an interlayer will have a ductile amorphous stratum to which a crystalline stratum is integrally attached. Alternatively, amorphous strata may be on either side of the interlayer with a crystalline core.

In a preferred embodiment, an interlayer for joining superalloys has a nickel-base and a boron content. An alternate embodiment interlayer has substantially the composition of the superalloys for which it is usable, but lacks aluminum, titanium and carbon, while including a melting point depressant, such as boron. Preferred TMP interlayers typically have melting points about 60° C. less than the melting point of any workpiece on which they are used.

An advantage of the invention is that homogeneous interlayers can be formed from normally brittle materials, and the interlayers can be conveniently shaped and formed as by stamping, punching, bending, and the like. In addition, the general handling of the interlayers is made easier. To practice the invention it is not necessary to be limited to particular alloy compositions and interlayer configurations which are entirely convertible to an amorphous state, but those which are only partially convertible are usable as well. The workpieces joined according to the invention will have stable high performance metallurgical structures. But with more formable amorphous structured interlayers, the ease for forming sound joints by brazing and bonding is improved, and the cost is lowered. The invention is particularly suited to the joining of high temperature nickel base superalloys but is adaptable to other metallurgical systems as well.

DESCRIPTION OF THE PREFERRED EMBODIMENT

Figure 1:
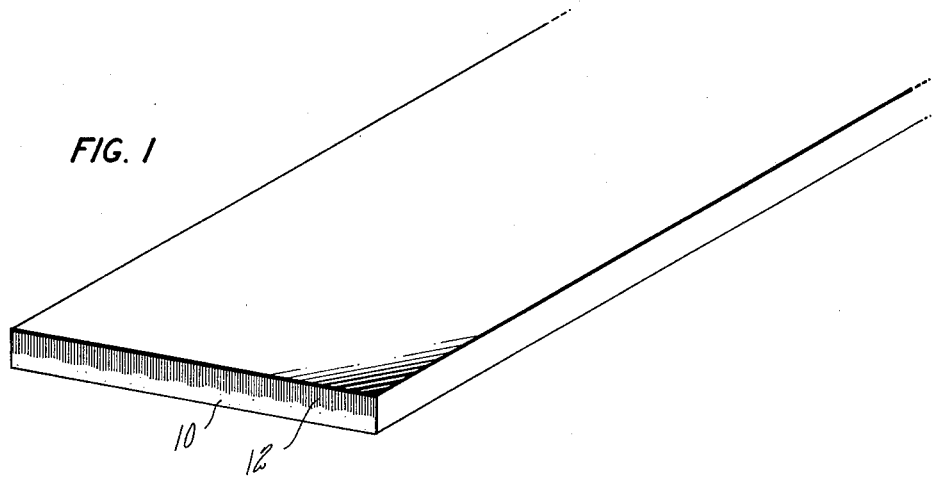
FIG. 1 shows an interlayer with an amorphous stratum and a crystalline stratum.

The preferred embodiment is described in terms of joining nickel-base superalloys of the types which are used in gas turbine engines, although as will be apparent the invention will be equally applicable to other base alloys, and in any joining process where it is desirable to have an interlayer. A workpiece superalloy for which the invention is particularly suited is cast MAR-M200 plus hafnium, having the nominal weight percent composition 9 Cr, 10 Co, 2 Ti, 5 Al, 12.5 W, 0.14 C, 1 Cb, 2 Hf, 0.015 B, balance nickel. Another is the alloy Udimet 700, having the nominal weight percent composition 15 Cr, 15 Co, 3.4 Ti, 4.3 Al, 4.4 Mo, 0.007 C, 0.016 B, balance nickel.

Interlayer Alloys

Representative compositions of alloys suitable for brazing and bonding cast nickel-base alloys are shown in Table 1. Those designated by the AMS (Aerospace Materials Specification) prefix are mostly used as brazing alloys, while those with the UT (United Technologies Corporation) designations are more prevalently used for diffusion bonding. It will be noted that generally the AMS alloys contain silicon and boron, will small quantities of phosphorous and carbon. The UT alloys mostly contain only boron as the melting point depressant, and have on the whole a lower metalloid content. As a result, the UT alloys will tend to have somewhat higher melting points than the AMS alloys. The alloys in Table 1, and other alloys for brazing and bonding, are commercially procurable or readily fabricated as ingots by conventional melting, pouring and casting techniques.

TABLE 1

Nominal Compositions of Alloys
(All have balance of nickel)

| Alloy | Cr | Si | Co | Fe | W | B | Other |
|---|---|---|---|---|---|---|---|
| AMS 4775 | 16.5 | 4 | — | 4 | — | 3.8 | C,P |
| AMS 4776 | 16.5 | 4 | — | 4 | — | 3.8 | low C |
| AMS 4777 | 7 | 4 | — | 3 | — | 3 | C,P |
| AMS 4778 | — | 4.5 | — | — | — | 2.9 | C,P |
| AMS 4779 | — | 3.5 | — | — | — | 1.8 | — |
| AMS 4782 | 19 | 10 | — | — | — | — | — |
| UT 1 | 13 | 4.5 | 0.5 | 4 | — | 2.8 | C |
| UT 2 | 15 | — | — | — | — | 2.7 | — |
| UT 3 | 10 | — | 10 | — | 5 | 2.7 | — |
| UT 4 | 15 | — | 15 | — | — | 2.7 | 5 Mo |

Based on the foregoing, a generalization of the properties required of TMP interlayers can be made. These properties include a composition which is mechanically and chemically suited for use in conjunction with the workpieces being joined and a composition which produces a melting point which is less than that of the metals which are being joined. Typically, for joining iron and nickel base alloys, a desired interlayer will be a nickel alloy with a liquidus of 60° C. or more below the solidus of the workpieces. A narrower melting point difference might be acceptable in the case of some alloys, but generally it is necessary that the interlayer liquify sufficiently to flow and fill the joint at a temperature which does not adversely affect the base metals. In other circumstances, the interlayer melting point may have to be substantially less than that of the workpieces to avoid deleterious effects on the workpiece microstructure. Another characteristic required of the interlayer is that it be capable of forming a metallurgical bond with the workpieces upon the solidification from the melt. This is required because if there is no metallurgical bond, then the joint will have insufficient strength, whether it be a brazed or diffusion bonded joint.

The composition of a TMP interlayer must make it suited for conversion to an amorphous state. As stated previously, the characteristics of readily convertible alloys are not amenable to precise definition, and are largely a matter of experiment. Fortunately, known nickel brazing and bonding alloys have shown by experiment the desired characteristics. The invention will be usable with other base alloy systems and interlayers when experiment shows that interlayer alloys have all the necessary characteristics enumerated above.

As the previously referenced patents state, for diffusion bonding a preferred interlayer for superalloys contains up to 5% boron. A further preferred practice is that the interlayers have a composition substantially similar to that of the superalloy but excluding or limiting aluminum, titanium and carbon, when boron is used as the melting point depressant. Although silicon is not commonly used as a melting point depressant for diffusion bonding it is quite common in AMS braze alloys. In specialized applications, silicon and phosphorous might be used in diffusion bonding interlayers as well. As should be evident from the general discussion herein, any alloy which is suitable for brazing or diffusion bonding is also suitable for TMP bonding if it can be made amorphous.

Interlayer Fabrication

As the summary indicates, a TMP interlayer in accord with the invention is in part comprised of at least a portion with an amorphous structure. This portion is present as a continuous, relatively ductile stratum which imparts integrity to the otherwise brittle interlayer. The following describes how such interlayers may be formed. The subsequent section describes more particularly the structure which must be present in a TMP interlayer. In this discussion, it is presumed that a desired interlayer foil has a particular thickness, length, and width. This is conceived as being most easily obtained by forming a random length ribbon of a particular cross section, and then shearing or stamping the ribbon to the exact foil size desired. However, it is also contemplated that the initial formation of a filament may be followed by further processing, as by machining or forming, to alter the cross section.

To convert an ingot of an interlayer alloy into a foil with amorphous structure, the metal may be melted and then resolidified with cooling of the melt at a high rate to form the desired solid shape. Several techniques are available for achieving this, and they mostly involve contacting the liquid metal with a smooth cool surface, such as copper maintained below 100° C. Most simply a small quantity of molten metal can be squeezed into a thin foil between two cool anvils. Alternatively, physically deposited particles may be accreted as a film. More desirably, continuous filament casting techniques revealed in various U.S. patents are usable, with suitable modification to resist molten super alloy attack and form the desired cross section. For example, Pond U.S. Pat. No. 2,825,108 discloses the use of a nozzle to force metal onto a rotating heat extracting surface; Steward et al U.S. Pat. No. 3,812,901 discloses a rotating disk ejecting a filament from the surface of a melt; Kavesh U.S. Pat. NO. 3,938,583 discloses an improved continuous filament process using rotating disk ejection and refers to earlier filament making art as well. Other art pertinent to interlayer fabrication appears in Kavesh U.S. Pat. Nos. 3,881,540; Bedell 3,862,658 and Bedell 3,881,541. Accordingly, we hereby incorporate all the aforementioned patents by reference, while noting further that other art for making filaments is disclosed in the open literature and that cast filaments may be procured in experimental quantities from commercial sources. Of course, to obtain amorphous atomic structure in any portion of a filament formed from a liquid, the liquid must be cooled at a sufficiently rapid rate. For the nickel base interlayer alloys in Table 1, this is of the order of $10^{5°}$ C. per second. Thus, only apparatus and processes adapted to achieve such conditions in filaments of the desired dimensions will be suitable for directly making TMP interlayers as they are further described below. While the invention is discussed in terms of ribbons, flat filaments and foils, in particular instances interlayers which have other lower aspect ratio cross sections, such as circular, are within contemplation.

The presence of the amorphous state in a filament or foil is typically determined by examination of the X-ray diffraction pattern. Optical and electron transmission microscopy can also be used to verify the absence of longrange crystallographic ordering which is characteristic of amorphous metals. For purposes of this specification, a portion of metal alloy characterized as amorphous may have within it isolated islands of crystalline metal structure material which are comprised of either impurities or elements of the metal alloy.

Further information regarding the techniques for rapidly quenching liquid metals in order to convert them into an amorphous atomic structure and details of the techniques for analyzing such material are obtainable by reference to the following: "Rapidly Quenched Metals", Proceedings of the Second International Conference on Rapidly Quenched Metals, Cambridge, Mass., November 1975, N. Grant and G. Giessen, Eds. (also Materials, Science and Engineering, Vol. 23, No. ⅔), Elsevier Sequoia SA, Lausanne, Switzerland, 1976; "Metallic Glasses", Papers of Materials Science Seminar of American Society for Metals, September 1976, American Society for Metals, Metals Park, Ohio, 1978; "Rapidly Quenched Metals", Proceedings of the Third International Conference, Brighton, Sussex, July 1978, Metals Society, London.

While our preferred mode of practicing the invention is to form the interlayer foil from the liquid with an amorphous stratum being created during the solidification process, it is also possible to practice the invention by using the techniques revealed in Banas et al U.S. Pat. No. 4,122,240. To so practice the invention, a foil would be made by solidifying the melt as a crystalline ribbon or by such other means as were available. Thereafter, the skin melting surface treatment revealed in U.S. Pat. No. 4,122,240 would be used to create an amorphous layer on one or both surfaces.

The thickness and width of interlayers may vary considerably. Desired thicknesses may range from 0.02 to 0.25 mm while widths may vary from 2 to 25 mm or more. The maximum thickness will be limited by the apparatus cooling rate capability and the necessary amorphous-crystalline structure balance described below. The width will be limited by the capability of the apparatus. Of course, multiple thin pieces may be used to build up a desired total interlayer thickness or width for a particular joint.

Interlayer Structure

A TMP interlayer of the invention must have at least a portion which has an amorphous structure. Inasmuch as the preferred manufacture of interlayers entails rapidly quenching liquid metals into ribbons, the portion of the foil which is in contact with the heat extraction surface or medium will be that which experiences the highest cooling rate and therefore, will most likely be amorphous. By way of example, if the interlayer is formed in an apparatus or method wherein heat is extracted from one side of the ribbon then that side will more easily be rendered amorphous.

The rate of heat extraction is of course dependent upon the particular method used to rapidly quench the interlayer alloy. The degree to which a particular interlayer alloy foil has an amorphous structure will be further influenced by its thermal and physical characteristics and thickness. The degree or ease of amorphous structure obtained will be enhanced by lowered thickness, specific heat, heat of fusion, and density and increased thermal conductivity. Generally, since the cooling rates required for forming an amorphous structure are exceedingly high, it is difficult to fully quench a relatively thick nickel alloy foil, e.g., one of the order of 0.2 mm. Thus, it is a desirable feature of the invention that TMP interlayers need not be fully amorphous, as disclosed below.

A TMP interlayer which is not fully amorphous will be characterized by an amorphous portion which forms a continuous stratum 10 across one principal surface, as shown in FIG. 1. Where the cooling rate is insufficient, a very fine micro-crystalline metal structure 12 will occur. Naturally, this will be integral with the amorphous stratum, as shown in FIG. 1. The crystalline portion of the interlayer will have more the normal brittle characteristics of the typical interlayer alloy. Thus, if the foil shown in FIG. 1 is bent so that the crystalline stratum 12 is in tension, considerable cracking will likely be evidenced. However, the more ductile amorphous stratum 10 will maintain the structural integrity of the foil. If on the other hand the foil is bent in the reverse direction so that the crystalline stratum is in compression, then the tensed amorphous stratum will deform and evidence a multiplicity of shear bands. Therefore, the amorphous stratum provides structural integrity to the interlayer for forming and shaping. We have not run controlled experiments to determine the limiting structural configurations of interlayer foils, as they will be dependent on the cross section and the direction in which they are bent with respect to the crystalline-amorphous strata. And of course, the desired limits will be dependent on the end application of the interlayer foil with regard to the degree of formability which is required. But on the whole, our more significant conclusion is that an interlayer foil having at least a portion which is amorphous will exhibit an ability to be shaped and formed with greater resistance to the brittle fracture which is characteristic of interlayer with no amorphous structure whatsoever. Based on our observations, we believe that the amorphous portion of the interlayer shown in FIG. 1 should be at least about 30% of the thickness (or volume) of the foil when the foil is a nickel base boron containing alloy. A lower volume percent, e.g., 10, may be usable in special instances where the alloy has different properties or the application is less demanding than those we typically conceive for the manufacture of gas turbine components. Of course, it should be evident that foils which are in greater proportion amorphous, up to 100%, will be equally satisfactory as TMP interlayers.

Figure 2:
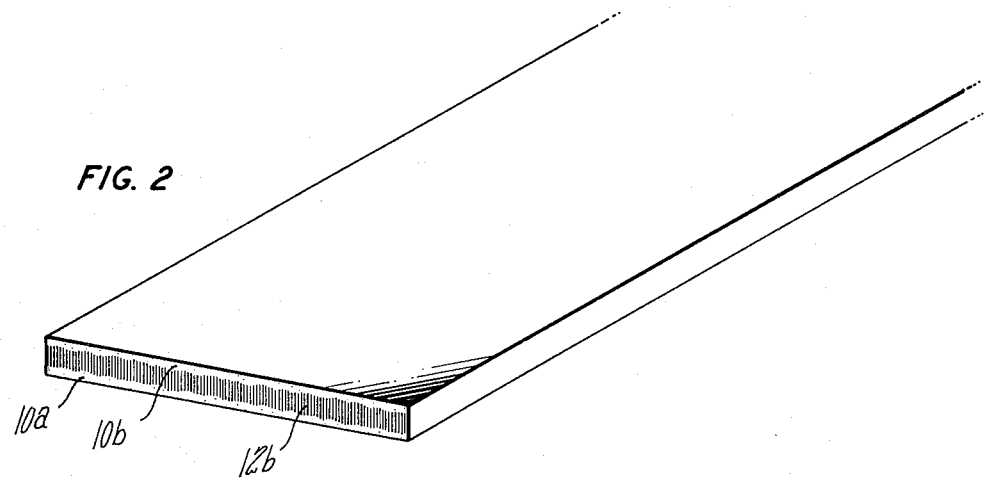
FIG. 2 shows an interlayer with two amorphous surface strata containing a crystalline stratum.

FIG. 2 shows the cross sectional structure of a foil wherein the amorphous atomic structure is present in two strata 10a and 10b, one on each principal surface, with a crystalline portion 12b contained between. Such an interlayer would be produced by a method in which heat is extracted from both surfaces of the ribbon. Since there are two ductility lending strata, it would be anticipated that a lower thickness of each strata would be adequate to impart formability to the interlayer foil, compared to the embodiment shown in FIG. 1. Accordingly, our judgment is that the same total volume percent of amorphous structure, namely 30%, divided between the two strata will be most often adequate to achieve the objects of the invention in an interlayer of the type shown in FIG. 2. The rectangular cross sections shown in the figures are for exemplary purposes only and it should be apparent the foregoing descriptions are applicable to other cross sections as well.

TMP Joining Process

The following describes the practice of TMP bonding. An interlayer is provided having the following characteristics: a melting point less than the metals being joined; at least one continuous surface stratum with an amorphous metal structure which imparts formability to the interlayer; and an amorphous phase comprising 30 volume percent or more of the interlayer. The interlayer is then shaped as by stamping, shearing, machining, or otherwise, to the shape which conforms to the faying surfaces. The interlayer is then placed between the faying surfaces of the workpieces and the workpieces are positioned so that the faying surfaces are as close as feasible. (In particular instances, it may be desirable to supply surplus interlayer alloy to the joint; in such cases, the interlayer foil would have greater surface area than that of the faying surfaces of the workpieces.) If the faying surfaces are contoured, then as the workpieces are pressed together the interlayer foil will be bent accordingly if it has not been otherwise preformed to the contour. The amorphous stratum in the interlayer will impart compliance to the interlayer to allow it to contour itself to the faying surfaces, beyond that which would be expectable for a purely crystalline interlayer where fracturing and possible mislocation might result. Next the assembly of workpieces and interlayer is heated, as by a furnace or induction heater, typically in a controlled atmosphere or vacuum. In other instances, fluxes and oxidizing heat sources might be used. The temperature is raised above the melting point of the interlayer, at a rate, and to a degree, sufficient to cause the interlayer to liquify within the joint. Usually the assembly is held at temperature for a period of time to obtain metallurgical interaction between the interlayer and the workpieces. Generally, this interaction entails dissolution of minor surface films on the workpiece and interlayer and a degree of alloying between the interlayer and the workpiece. Usually this occurs in a matter of minutes. In brazing, solidification of the interlayer is obtained by cooling the assembly. Typical cooling rates are 5° C. per second or less. As the joint often has relatively small exposed surface area compared to the workpieces, this may mean that heat extraction from the interlayer will be through the workpiece and epitaxial solidification from the workpiece surface will often take place. Of course, non-epitaxially solidified braze joints can be quite satisfactory as well.

In transient liquid phase diffusion bonding, after the interlayer melts, the temperature is sustained usually constantly at a point above the interlayer melting point—as high as the workpiece materials will endure without adverse effect—for a period of time sufficient for interdiffusion of elements to take place between the interlayer and the workpiece. As is disclosed in the references, this interdiffusion leads to solidification of the interlayer due to its changing composition. The phenomena in the joint region are such that the interdiffused interlayer will solidify epitaxially from the faying surfaces of the workpieces, which of course typically have crystalline metal structures. Thus, a common feature of TMP joining is that a crystalline metal structure results in the joints, most usually one which is epitaxial with the workpieces.

An interlayer must produce a sound metallurgical structure with good bonding to the workpieces. This is determinable by mechanical testing. Even more conveniently, metallographic inspection of a good workpiece joint will show it to be substantially free of voids, oxide films, and concentrated precipitates formed during joining. An interlayer must also have a composition which produces a joint with the capability of resisting the thermal stresses associated with cooling of the assembly. Properties which affect its performance are its elevated temperature strength and ductility, thermal expansion, shrinkage on solidification, and solidus-liquidus temperature differential.

A particularly useful application of TMP bonding is for the joining of cast single crystal superalloys. In such instances it is an object to have the single crystal structure extend across the joint region of a workpiece assembly. To achieve this, the crystal structures of the workpieces are essentially aligned to within a tolerance which experiment shows will avoid creation of a discontinuity after joining. The TMP interlayer is interposed and the diffusion bonding process is carried out as generally above, to ensure epitaxy. It will be found that a single crystal joined assembly will be the result from the epitaxial solidification.

The following examples illustrate the practice of the invention.

EXAMPLE 1

An alloy having the composition of UT-4 was melted and converted to a solid filament with the object of forming a ribbon of approximately 50 micrometers thick and 5 millimeters wide. The alloy was cooled at a rate sufficient to make it at least partially amorphous; the necessary rate was estimated to be on the order of $10^{5°}$ C. per second. The ribbon was made in an apparatus wherein high rate cooling was principally on one surface of the ribbon. The ribbon was about 44 micrometers thick and contained a stratum of amorphous material for about 40 micrometers of its thickness. Crystalline material comprised the balance of about 3 micrometers of the thickness, on the side away from the heat sink. The presence of the amorphous and crystalline structures in the UT-4 ribbon was verified by X-ray diffraction. A Vickers Diamond Pyramid microhardness test produced a value of about 1,000 DPH in the amorphous material.

The ductility of the foil was evaluated by a simple bending test in which the behavior of the material is observed while the foil is folded back on itself. Widespread cracking was evident when the crystalline face was in tension and extensive shear banding without fracture was evident when the amorphous face was in tension. But, in both instances, the foil was readily bent while remaining in one piece due to the support provided by the ductile amorphous material. In contrast, prior experience is that entirely crystalline material will fracture and shatter when similarly bent. Heating of the foil at 500° C. for one hour caused complete transformation of the amorphous phase to a crystalline structure, and the material was found to become quite brittle, as is characteristic of crystalline foils made by other procedures. In this condition, the foil fractured without perceptible strain in bending.

Transmission electron microscope hot stage observations and differential scanning calorimeter testing both showed that the crystallization transition temperature for the amorphous segment was about 400° C. The melting behavior was found to be similar to that of a wholly crystalline material: the solidus was nominally 1050° C. and the liquidus was nominally 1200° C. Due to the high cooling rate, the homogeneous nature of the liquid melt was reproduced in the amorphous portion of the interlayer, except for some inclusions. There was no evidence of compositional segregation. While this feature is metallurgically interesting, it was not presumed to be necessary for the practice of the invention, based on the prior work with crystalline interlayers referred to in the introduction.

The interlayer was placed between the two cast Udimet 700 workpieces with flat faying surfaces. The assembly was placed in a vacuum furnace at 1175° C. where it was heated by radiation. The assembly was held at temperature for a period of 4 hours and then removed to cool. Examination showed that the joint had solidifed by interdiffusion of elements, most particularly boron, and that the joint was of a crystalline structure epitaxial with the joint.

EXAMPLE 2

An AISI 410 martensitic stainless steel gas turbine compressor vane and shroud assembly required brazing. The end of each vane was butted against the inside diameter of the circumferential shroud ring. The curved faying surface had a projected surface area represented by a skewed parallelogram. A 38±5 micrometer thick fully amorphous foil of UT-1 alloy was cut with a conventional metal shear to a shape 0.4 mm greater at the periphery than the faying surface. The extra interlayer material was included to provide excess liquid which would form a good fillet in the joint. The foil was interposed centrally in the curved joint and the vanes and shroud were fixed tightly with respect to each other.

The assembly was placed in a resistance heated vacuum furnace at $5 \times 10^{-4}$ torr at 1160° C. for 20 minutes. The assembly was cooled at a rate of about 10° C. per minute in the furnace to 900° C. to assure completeness of braze solidification and avoid hot tearing. Then argon was introduced to accelerate the cooling rate to about 10° C. per minute. When further cooled to about 300° C., the assembly was removed from the furnace. Conventional inspection showed a sound joint with a desirable fillet.

Having thus described a typical embodiment of our invention, that which we claim as new and desire to secure by Letters Patent of the United States is:

1. An interlayer foil for joining metal workpieces, characterized by a desired composition having a melting point less than the metals being joined and a capability of forming a metallurgical bond with the workpieces upon resolidifying from a melt as a crystalline solid while in contact with the workpieces, and a portion of at least 30 percent by volume which is amorphous, the portion being a continuous stratum on at least one surface of the interlayer, the balance of the interlayer being a crystalline solid integrally attached to the amorphous portion.

2. The interlayer foil of claim 1 wherein the amorphous portion is comprised of continuous strata on the two principal surfaces with the crystalline balance contained therebetween.

3. A nickel base interlayer foil for joining superalloy workpieces, characterized by a desired composition containing up to 5 percent boron, having a melting point less than the superalloys being joined and a capability of forming a metallurgical bond with the superalloys upon resolidifying from the melt as a crystalline solid while in contact with the workpieces, and a portion of at least 30 percent by volume which has an amorphous metal structure, the portion being a continuous stratum on at least one surface of the interlayer, the balance of the interlayer being a crystalline solid integrally attached to the amorphous portion.

4. The foil of claim 2 further characterized by a composition which is substantially that of the superalloy but which lacks aluminum, titanium, and carbon.

5. An interlayer for joining metal workpieces characterized by:
a uniform and homogeneous composition, to provide uniform melting;
a melting point less than the melting point of the metals of the workpieces being joined, to allow liquification within, and filling of, a joint;
an amorphous structure in a portion cooled from the liquid state at a rate of about $10^5$° C. per second or greater the amorphous structural portion being at least 30 volume percent of the interlayer, to provide a ductile stratum;
a capability of dissolving minor surface films and alloying with the workpieces when liquified;
a crystalline structure with a good metallurgical bond to the workpiece faying surfaces upon melting and resolidifying in contact therewith to provide strength to a joined structure.

6. The interlayer of claim 5 further characterized by: thermal and physical characteristics which allow the formation of the amorphous portion when liquid metal in a layer of about 0.1 mm thick is brought in intimate contact with a high conductivity copper chill maintained below 100° C.

7. The method of improving the formability and compliance of nickel alloy interlayers containing embrittling melting point depressants, usable for joining metals of melting points higher than the interlayer, which comprises forming an interlayer with a portion having an amorphous structure.

8. The method of improving the formability and compliance of metal alloy interlayers usable for joining metals and which contain melting point depressants which cause embrittlement comprises, forming at least 30 volume percent of the interlayer as a continuous amorphous structure which is convertible to a crystalline solid during a joining process, the stratum imparting resistance to cracking during forming and shaping of the interlayer.

9. The method of joining at least two metal workpieces comprising:
providing an interlayer having a composition with a melting point less than the metals being joined and a capability, with respect to the workpiece, of dissolving minor surface films, alloying and forming a good metallurgical bond upon solidification, and having at least one continuous surface stratum with an amorphous structure, the interlayer further having at least 30 volume percent amorphous structure;
interposing the interlayer between the faying surfaces of the workpieces to form an assembly;
heating the assembly above the interlayer melting temperature, to cause the interlayer to liquify within the joint;
holding the assembly at a temperature above the interlayer melting point a sufficient time to cause a desired metallurgical interaction of the interlayer and the workpieces;
cooling the assembly to produce an assembly with a solid interlayer having a crystalline structure with strong metallurgical bonds to the workpieces.

10. The method of claim 9 wherein the workpieces are superalloys and the interlayer is a nickel base alloy with up to 5 weight percent of an element selected from the group consisting of boron, silicon, or phosphorous or mixtures thereof.

11. The method of claim 10 wherein the interlayer is converted into a crystalline solid by the cooling of the assembly.

12. The method of claim 10 wherein the interlayer is converted into a crystalline solid having epitaxy with the workpiece faying surfaces by interdiffusion of elements during the holding of the assembly at a temperature above the melting point which the interlayer had before the assembly was heated.

13. The method of claim 12 wherein the interlayer is further characterized by having a composition substantially corresponding with the composition of one of the superalloys being joined except that aluminum, titanium and carbon are substantially excluded.

14. The method of claim 12 wherein the workpieces have aligned single crystal structures and the crystalline structure of the interlayer after conversion is aligned with that of the workpieces.

* * * * *